Patented July 3, 1951

2,559,043

UNITED STATES PATENT OFFICE 2,559,043

STARCH ADHESIVE SHEET MATERIAL AND COMPOSITION THEREFOR

Leonard Russell Nestor, St. Paul, Minn., assignor to Minnesota Mining & Manufacturing Company, St. Paul, Minn., a corporation of Delaware No Drawing. Application November 26, 1947, Serial No. 788,313

7 Claims. (Cl. 106—213)

This invention relates to a novel adhesive sheet material of the nature of gummed paper tape, box-sealing tape, gummed labels or the like, having a water-actuated adhesive coating. The sheet may be in the form of a continuous roll or tape, in which case it is suitable for use in automatic packaging operations or the like. Alternatively, it may be cut into small individual sections, e. g. in the form of labels or stamps. On being moistened with water, the dried adhesive coating is immediately and uniformly activated to a temporarily tacky condition, and then sets up rapidly when the tape is applied to paper, as in the taping of corrugated paper cartons.

Previously known water-activated adhesive sheets have utilized principally either dextrin or animal glue as the adhesive mass. Dextrin, commonly used on postage stamps, is effective for low-strength bonding operations, but forms much too weak a bond for many purposes and sets up slowly after application. Animal glue coatings, such as hide glue, become tacky rapidly on wetting with water and quickly form extremely strong bonds with paper or other surfaces to which they are applied. However, animal glue is frequently found to contain traces of greasy material, presumably from the animal products employed as the source of such glue. These materials form water-repellant surface areas on the glue coating, with the result that activation is non-uniform. In addition, animal glue has been high in price.

The present invention has as its object the provision of water-activated adhesive sheet material which avoids the above and other deficiencies of products previously available. A specific object is the provision of an adhesive sheet which is rapidly and uniformly activated, on moistening with water, to a tacky but rapid-setting condition in which it is capable of quickly forming high-strength bonds with surfaces such as paper. Specifically, and particularly where the sheet is to be used in conjunction with automatic packaging machines or the like, an adhesive sheet is desired which, on being properly moistened with water, becomes fully and uniformly adhesive within not more than about one second thereafter and remains fully adhesive or tacky for at least about 10 seconds, during which time it will form a strong bond with paper within not more than four or five seconds after initial contact therewith. A still further object is the provision of an adhesive sheet having these various desirable properties during and after application, and furthermore which does not deteriorate, e. g. become inactivatible, on prolonged storage.

These and other objects and advantages are attained in the present invention, a preferred example of which will now be given. However, the invention is not to be limited to this specific exemplary formula, but embraces broader aspects, as will be apparent from the disclosure as a whole.

*Example*

| | Pounds |
|---|---|
| Water | 1400 |
| Sodium hypochlorite solution | 250 |
| Potato starch | 1700 |
| Sodium hydroxide solution (50%) | 340 |

The water and sodium hypochlorite solution are mixed in a corrosion-resistant kettle and brought to a temperature of about 85° F. The starch is then added, with high speed continuous mixing, at as rapid a rate as possible consistent with the formation of a uniform slurry. Stirring is continued, and the temperature of the mixture arises, during the course of about thirty minutes, to approximately 105° F. Meanwhile, the mixture, which at the start is substantially neutral or only very slightly alkaline, becomes increasingly acidic. During this time, aliquot samples of the slurry are periodically withdrawn, neutralized and converted to a highly viscous state by addition of the corresponding amount of sodium hydroxide solution as indicated in the formula, and tested for viscosity.

As soon as a converted test sample is found to have a viscosity of 800–1200 centipoise, measured at 120° F. and at a concentration of approximately 50% solids as provided in the formula, the sodium hydroxide solution is added to the batch. The rate of addition is controlled so that the temperature, which rises somewhat on addition of the alkali, does not exceed about 125° F. The alkali converts the watery slurry to a thick, smooth, viscous mass, having a viscosity of about 800–1200 centipoise, and suitable for application to paper or other backings in the manufacture of adhesive sheet material.

The amount of hypochlorite employed must be sufficient to produce the required reduction in viscosity, but should not be much in excess of such amount for best results. In the formula given, hypochlorite solutions containing about 12.5% of free chlorine have produced the best results, although some variation from this value is permissible. With certain starches, for example, hypochlorite solutions containing up to 14% of free chlorine have been found to be advantageous.

Where the temperature of the solution prior to addition of starch is much removed from 85° F., the time required for the subsequent reduction to the desired viscosity after conversion may differ considerably from that above indicated. For example, reducing the initial temperature to 80° F. increases the time required to approximately 35 minutes. The reaction may be carried out at much lower temperatures in correspondingly longer times. Conversely, an increase in temperature speeds up the action of the hypochlorite and reduces the time required for preparation of the adhesive. The temperature must be kept low enough throughout this phase of the preparation, however, to avoid cooking and gelatinizing the starch and also to avoid dextrinization or other degradation of the mixture.

Too high a temperature, as also too high a concentration of hypochlorite, may speed up the reaction to a point where control is difficult.

The hypochlorite has been added to a preformed slurry of starch in water, in a modification of the procedure here indicated. Other modifications will be apparent.

Converting the starch slurry, i. e. adding the alkali, at an earlier stage in the reaction with the hypochlorite, results in an increased viscosity of solution and some increase in the strength of bond obtainable with the adhesive produced. Adhesives having a viscosity of somewhat over 4000 cps. have been successfully coated, but much heavier mixtures are not suitable for transfer roll coating operations nor for the formation of thin films on thin paper backings. Viscosities less than about 500–800 cps. (measured at 120° F. and 50% concentration), such as result from the use of much larger quantities of sodium hypochlorite, ordinarily indicate a weaker adhesive having a much slower rate of bonding.

The viscosity is influenced, as just stated, by the extent of the reaction between starch and hypochlorite. The viscosity is also influenced by the temperature of reaction, the type of starch, the amount of alkali, and by various other factors, all as herein disclosed. It has been found that adhesives designed for use in carton-sealing paper tapes and the like, and prepared according to the present invention, must for best results be so controlled as to provide a viscosity of about 500–4000 cps. at 120° F. and 50% solids content.

Such an adhesive solution is conveniently applied to the paper backing at 100–120° F. by means of transfer rolls, and the water removed by evaporation at elevated temperature, for example in an oven heated to 200–270° F. Obvious variations include coating with a knife spreader, drying on heated drums or with radiant heat, etc.

A water-activated gummed tape was prepared according to the above description. It consisted of a coating of 15–20 lbs. per ream (dry basis) of the alkali-converted reacted starch adhesive on a kraft paper backing having a ream weight of 60 lbs. (per ream of 320 square yards). This coating weight is substantially the same as that normally employed for the animal glue coating of equivalent glue-coated gummed tapes. The adhesive was applied with transfer rolls, and the sheet was then dried in an oven heated at 270° F. until the adhesive was non-tacky and the coated sheet could be wound up in roll form and subsequently unwound without blocking. The product was tested by passing a strip of the material through a roll type gummed tape dispenser having a knurled metal roller, applying the moistened tape to uncoated kraft paper, and determining the rate and duration of activation, the rate of setting, the adhesion, and other properties. The amount of water applied to the tape by this means was between about 4.5 and 5.5 grains on a strip measuring 3 x 11 inches, i. e. between about 8 and 10 lbs. per 320 square yards. The values of activation time, etc., here given are based on such application. However, the tape could be activated and used successfully with widely varying quantities of water.

In a comparative test, a high grade commercially available gummed tape of similar weight but carrying an animal glue adhesive coating took up only about one-half as much water when tested on the same dispenser. The water did not wet the glue surface uniformly, and did not penetrate the glue as rapidly as in the case of the starch base adhesive.

It was first observed that complete and uniform wetting of the starch base adhesive surface was secured even at relatively high rate of travel through the dispenser. The moistened adhesive was found to be completely and uniformly activated over its entire surface, and to be fully adherent to the uncoated kraft paper within less than one second after the application of the water. The activated strip remained tacky for at least 10 seconds, and in many cases for at least 25 seconds, after activation, i. e., it could be adhered to the kraft paper at any time within such period.

The moistened tape was laid on a test sheet of uncoated kraft paper and rolled down uniformly and under moderate pressure, and was then slowly peeled away. While the adhesive layer remained wet and tacky, the tape could be removed without delaminating either the tape backing or the test sheet. However, the adhesive soon set up to a point at which delamination occurred. The time required for this firming action to take place is directly related to the time required in the sealing of cardboard cartons, since the tape and cover must ordinarily be mechanically or manually held in place until the adhesive no longer slides or "skates" under the tension of the folded cardboard cover. Under the conditions given, the following values were secured for the adhesive sheet here described. A kraft paper, such as is commonly used as a paper liner for corrugated paper cartons, weighing 60 lbs. per 320 sq. yds., was used as the test sheet.

Table

| | | | | |
|---|---|---|---|---|
| Time of application, seconds, after moistening. | 5 | 10 | 15 | 2 |
| Time for delamination, seconds, after application. | 2¾ | 2¼ | 1½ | 1 |

Although not indicated in the table, specimens applied within less than one second after moistening were also found to adhere to the test sheet, and to form a firm bond within not more than about 4–5 seconds. Tapes having this combination of properties are eminently satisfactory for use in automatic packaging machines. Tape having an animal glue adhesive coating, when similarly tested, was substantially equally rapid in activation and in setting time, but was observed to be unevenly activated. In some cases, the water formed isolated droplets over the glue surface. On the other hand, dextrin-coated tapes and labels, which are quite uniformly wet by water over the entire gummed surface, remain tacky and "slippery" much longer after the label is applied. Additionally, dextrin provides a bond having much lower strength.

It was also noted that, in comparison to the glue adhesives, the starch base adhesives took up a greater quantity of water and absorbed it in less time. The water rapidly penetrated the entire thickness of starch base adhesive and imparted a desirable degree of pliability or conformability to the sheet as a whole. This is a considerable advantage, particularly in paper tape which is required to conform to irregular surfaces, or to be folded around corners, etc, as in the sealing of cartons either by machine operation or manually. It is of general advantage with cloth backings, cellulosic films, or other backing materials which are made less stiff and rigid by the action of water.

Additionally, it was noted that labels coated with the starch base adhesive of this invention were permanently adherent to surfaces, such as polished aluminum and polished molded phenol-aldehyde resin surfaces, to which glue-coated or dextrin-coated labels have inadequate adhesion.

Sodium hypochlorite is a known oxidizing agent, and its action on the raw starch in the process hereinabove described is believed to involve an oxidation of the starch. Sodium hypochlorite solution may be prepared, for example, by passing chlorine into a solution of sodium hydroxide. It is a convenient and readily available reagent, and as used in the process herein described provides the desired results in terms of adhesive properties without adversely affecting the color, aging life, or other properties of the product. For these and other reasons, sodium hypochlorite is the preferred reagent. However, other hypochlorites, and other oxidizing agents may be substituted for this reagent with good results. For example, acidic permanganate solutions have been so employed, in which the amount of active material, e. g. potassium permanganate, was closely equivalent to the amount of sodium hypochlorite in the above example when calculated as an oxidizing agent. The desired end point of the reaction was conveniently determined by measuring of the viscosity of an aliquot portion of the batch after addition of the correct amount of alkali thereto. It was observed that the reaction could be closely controlled simply by controlling the amount of permanganate reagent added, since the reaction progressed rapidly to complete utilization of the active material.

Hydrogen peroxide is still another effective oxidizing agent, as is sodium persulfate. The slurry, which is acidic during the reaction, is converted to the adhesive state by addition of alkali.

Since barium ion forms undesirable water-insoluble complexes with starch, barium peroxide is not a desirable oxidizing agent for this purpose. Benzoyl peroxides is itself insoluble in water and hence is not suitable for these reactions. Such inherently undesirable reagents, which are unsuited for reaction with starch in an aqueous medium to produce a smooth, uniform, soluble adhesive mass having rapid activation and quick setting properties in coated form, are considered as being outside the scope of the expression "water-soluble oxidizing agent" as here employed.

The strength of the sodium hypochlorite solution (where this reagent is employed), expressed in terms of percent available chlorine, may be determined by adding a portion to acidic iodide solution and titrating the liberated iodine with standard thiosulfate solution. The required amount of hypochlorite or other oxidizing agent, expressed in terms of weight and strength of sodium hypochlorite solution in the example, may vary somewhat with different types or lots of starch, but will ordinarily be found to be approximately as indicated for best results. The oxidizing agent must be present in sufficient quantity, and the reaction must be allowed to progress sufficiently, so that the reacted starch will form a smooth, homogeneous solution of the desired viscosity on the addition of alkali. However, the hypochlorite or equivalent should not be present in much more than such amount.

Potato starch, specified in the example, has been replaced by other varieties of starch, e. g., corn starch, and sago starch, in preparing useful adhesive masses according to this invention. Air-dry starch normally contains about 10% moisture, conveniently determined by azeotropic distillation with toluene according to the Bidwell-Sterling method. Where the moisture content differs significantly from this value, corresponding changes are made in the stated weight of air-dry starch employed.

The addition of alkali to the processed starch slurry results in homogenizing the mixture, apparently by forming some soluble modification of the reacted starch. A definite minimum amount, dependent on the type and amount of oxidizing agent employed as well as the condition of the reacted starch itself, is required to convert all of the treated starch to this soluble state and to produce a smooth homogeneous solution having an alkaline reaction. Small additional amounts tend to reduce the viscosity of the solution and render it more stable for coating.

Even with these added small amounts of alkali, the adhesive does not appear to be particularly irritating to the skin, nor deleterious to the paper backing. Thus, coated tape in roll form has been found to retain its full tensile strength after a year of storage, even though it remained distinctly on the alkaline side. Peculiarly, the tape also retained its ability to activate and to adhere rapidly and firmly to various surfaces even after prolonged storage at high humidity and in an atmosphere of carbon dioxide. Stronger acids, e. g. sulfuric acid, cause the adhesive to revert to a non-adherent state.

In general, amounts of alkali equivalent to about 10–12 parts of sodium hydroxide for 100 parts of starch are found to produce the best results. Nine parts are in some cases found to be sufficient to convert the processed starch slurry to a homogeneous solution, and up to about 16 parts have produced useful adhesive compositions. It will be noted that 10 parts of sodium hydroxide to 100 parts of (air-dry) potato starch is specified in the example. Potassium hydroxide (particularly in the presence of added sodium chloride), sodium metasilicate, or quaternary ammonium or sulfonium bases are also effective, and are contemplated as coming within the meaning of the term "alkali" as herein employed. Ammonium hydroxide by itself is not fully effective, but may be used successfully in conjunction with reduced amounts of sodium hydroxide or other of the equivalent stronger alkalis. Lithium hydroxide is less soluble, and hence less effective, than sodium hydroxide. Calcium hydroxide forms undesirable insoluble lime salts.

Prolonged heating of the adhesive after addition of alkali, or heating to excessively high temperatures, is to be avoided. Thus, heating the converted starch mix to 160° F. reduces its useful life to a few minutes, whereas at 120° F. no significant change is noted within several hours, and at much lower temperatures the material may safely be stored for several days or longer. It is preferred to coat the material as soon as possible after its preparation, since the most rapid activation and fastest setting of the adhesive film is thus obtained. However, brief storage at normal room temperature in the wet state, or prolonged storage if the adhesive is first carefully reduced to a dry powder, appears to have no measurable effect on the quality of the resulting coated adhesive sheet.

The starch base adhesive alone, prepared as hereinabove noted, produces excellent results when employed as the adhesive coating for box-sealing tape, gummed paper tape, and the like. For certain purposes, additional desirable properties are obtained by the incorporation of various modifying agents in the adhesive mass. Thus, the addition of small percentages of humectants, e. g. glycerine, glycol, sorbitol, glucose, etc., to a substantial degree inhibits the curling frequently observed during or after drying of such gummed labels. For example, the addition of 10 parts, more or less, of glycerine, based on 100 parts of raw starch, has provided an adhesive coating having no tendency to cause blocking and having a reduced tendency to curl during drying. On application of water, this adhesive coating was activated to the tacky state even more rapidly than the glycerine-free adhesive. Casein, soluble lignin derivatives, or other analogous materials, may be admixed in various percentages to provide special properties. Soluble salts have been found to improve the wetting characteristics of the adhesive layer in many cases; thus, where potassium hydroxide was employed as the alkali, the addition of relatively minor amounts of sodium chloride produced beneficial results. Perfumes, inert fillers, dyes, wetting agents, and various other additive may impart desirable qualities to the starch base adhesives here disclosed, and compositions containing such materials are contemplated as coming within the scope of this invention.

What I claim is:

1. A water-activatible adhesive sheet material, characterized by rapid and uniform activation upon moistening with water, comprising a flexible backing and a thin, normally non-tacky dried surface coating of an adhesive composition comprising an alkaline-reacting starch base adhesive formed by holding a slurry of starch in an aqueous solution of an oxidizing agent below the temperature required to gelatinize the starch, to bring the starch mixture in an acidic condition to a point at which it is alkali-convertible to an adhesive mass having a viscosity as herein specified, and thereupon adding alkali to convert the said acidic starch mixture to a smooth, homogeneous, alkaline solution having a viscosity within the range equivalent to about 500–4000 cps. as determined at 120° F. and 50% solids, said addition of alkali being carried out while maintaining the temperature of the mass below the gelatinizing temperature.

2. A sheet material according to claim 1 in which the oxidizing agent is a hypochlorite.

3. A sheet material according to claim 1 in which the oxidizing agent is sodium hypochlorite and the alkali is added in a ratio equivalent to 9–16 parts of sodium hydroxide to 100 parts of starch.

4. A sheet material according to claim 1 in which the oxidizing agent is a permanganate.

5. A starch base adhesive composition comprising the soluble alkali-conversion product of a modified starch formed by holding a slurry of starch in an aqueous solution of an oxidizing agent below the temperature required to gelatinize the starch, to bring the starch mixture in an acidic condition to a point at which it is alkali-convertible to an adhesive mass having a viscosity as herein specified, and thereupon adding alkali, in an amount equivalent to 9–16 parts of sodium hydroxide for each 100 parts of raw starch, to convert the said acidic starch mixture to a smooth, homogenous, alkaline solution having a viscosity within a range equivalent to about 500–4000 cps. as determined at 120° F. and 50% solids, said addition of alkali being carried out while maintaining the temperature of the mass below the gelatinizing temperature.

6. A starch base adhesive composition according to claim 5 and containing a humectant.

7. A coated sheet material of the nature of gummed box-sealing tape, wherein the water-activated adhesive coating comprises the dried residue of a concentrated spreadable viscous adhesive solution prepared from a concentrated fluid slurry of starch, water, and a water-soluble oxidizing agent in which the proportion of starch to oxidizing agent is approximately that of 1700 parts of starch and 250 parts of sodium hypochlorite analyzing 12–14% available chlorine, said slurry being held at a temperature within the range of about 85–125° F. to bring the starch mixture in an acidic condition to a point at which it is alkali-convertible to an adhesive mass having a viscosity equivalent to about 500–4000 cps. as determined at 120° F. and 50% solids, and being converted to said adhesive mass by addition of alkali while maintaining the temperature of the mass below the gelatinizing temperature.

LEONARD RUSSELL NESTOR.

REFERENCES CITED

The following references are of record in the file of this patent:

UNITED STATES PATENTS

| Number    | Name        | Date           |
|-----------|-------------|----------------|
| 1,020,656 | Perkins     | Mar. 19, 1912  |
| 1,904,619 | Caesar      | Apr. 18, 1933  |
| 2,188,329 | Bauer et al.| Jan. 30, 1940  |
| 2,355,463 | Nivling     | Aug. 8, 1944   |
| 2,435,701 | Vallandigham| Feb. 10, 1948  |

FOREIGN PATENTS

| Number  | Country       | Date           |
|---------|---------------|----------------|
| 167,275 | Germany       | Jan. 31, 1906  |
| 17,650  | Great Britain | of 1898        |
| 188,992 | Great Britain | Nov. 23, 1922  |

OTHER REFERENCES

"A Practical Treatise on Raw Materials and Fabrication of Glue," Dawidowsky, 1884, pages 262 to 265.